United States Patent
Rao et al.

(10) Patent No.: US 10,990,443 B2
(45) Date of Patent: Apr. 27, 2021

(54) UTILIZATION PROFILING AND SCHEDULING OPERATIONS USING THREAD SPECIFIC EXECUTION UNITS USAGE OF A MULTI-CORE MULTI-THREADED PROCESSOR

(71) Applicant: International Business Machines Corporation, Armonk, NY (US)

(72) Inventors: Rahul Rao, Bangalore (IN); Venkatesh Sainath, Bangalore (IN); Vaidyanathan Srinivasan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

(21) Appl. No.: 16/209,248

(22) Filed: Dec. 4, 2018

(65) Prior Publication Data
US 2020/0174831 A1 Jun. 4, 2020

(51) Int. Cl.
| | |
|---|---|
| *G06F 9/48* | (2006.01) |
| *G06F 9/38* | (2018.01) |
| *G06F 11/34* | (2006.01) |
| *G06F 9/50* | (2006.01) |

(52) U.S. Cl.
CPC .......... *G06F 9/4881* (2013.01); *G06F 9/3842* (2013.01); *G06F 9/3851* (2013.01); *G06F 9/505* (2013.01); *G06F 9/5033* (2013.01); *G06F 9/5038* (2013.01); *G06F 9/5083* (2013.01); *G06F 11/34* (2013.01); *G06F 11/3409* (2013.01); *G06F 11/3414* (2013.01); *G06F 11/3433* (2013.01); *G06F 11/3466* (2013.01); *G06F 2209/501* (2013.01); *G06F 2209/5018* (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 6,338,133 B1* | 1/2002 | Schroter | G06F 9/3814 710/54 |
| 9,389,869 B2 | 7/2016 | Tran | |
| 9,715,415 B2 | 7/2017 | Shows | |
| 9,928,639 B2 | 3/2018 | Toksvig et al. | |
| 2015/0347192 A1 | 12/2015 | Blaine et al. | |
| 2016/0117199 A1* | 4/2016 | Sundaram | G06F 1/206 718/104 |
| 2017/0083383 A1* | 3/2017 | Rider | G06F 1/329 |

* cited by examiner

*Primary Examiner* — Qing Yuan Wu
(74) *Attorney, Agent, or Firm* — Cantor Colburn LLP; Bryan Bortnick

(57) ABSTRACT

A method for utilization profiling of thread specific execution units and scheduling software on a multi-core processor is provided. To perform the method, the multi-core processor profiles a workload received for execution by a core of the multi-core processor and logs an execution unit sensitivity to an operating system with respect to the workload. Further, the multi-core processor utilizes the execution unit sensitivity for subsequent workload scheduling to minimize sharing of hardware threads on the same core between workloads with similar execution unit sensitivities.

15 Claims, 3 Drawing Sheets

UTILIZATION PROFILING AND SCHEDULING OPERATIONS USING THREAD SPECIFIC EXECUTION UNITS USAGE OF A MULTI-CORE MULTI-THREADED PROCESSOR

BACKGROUND

The disclosure relates generally to processors, and more specifically, to a utilization profiling and scheduling operations using thread specific execution units usage of a multi-core multi-threaded processor.

In general, a multi-core multi-threaded processor can experience a scheduling conundrum when receiving and assigning a new task. Particularly, the multi-core processor must determine whether to activate the new thread on an already active core or to assign the new thread to a new core that requires activation. In the former case, power costs of core activation are saved and existing cores can run at a same voltage and frequency conditions. In the latter case, thread collision and execution unit utilization conflicts with active threads on the same core are prevented.

SUMMARY

According to one or more embodiments, a method for utilization profiling of thread specific execution units and scheduling software on a multi-core processor is provided. To perform the method, the multi-core processor profiles a workload received for execution by a core of the multi-core processor and logs an execution unit sensitivity to an operating system with respect to the workload. Further, the multi-core processor utilizes the execution unit sensitivity for subsequent workload scheduling to minimize sharing of hardware threads on the same core between workloads with similar execution unit sensitivities.

According to one or more embodiments, the above method can be implemented as a system, apparatus, and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Figure 1:
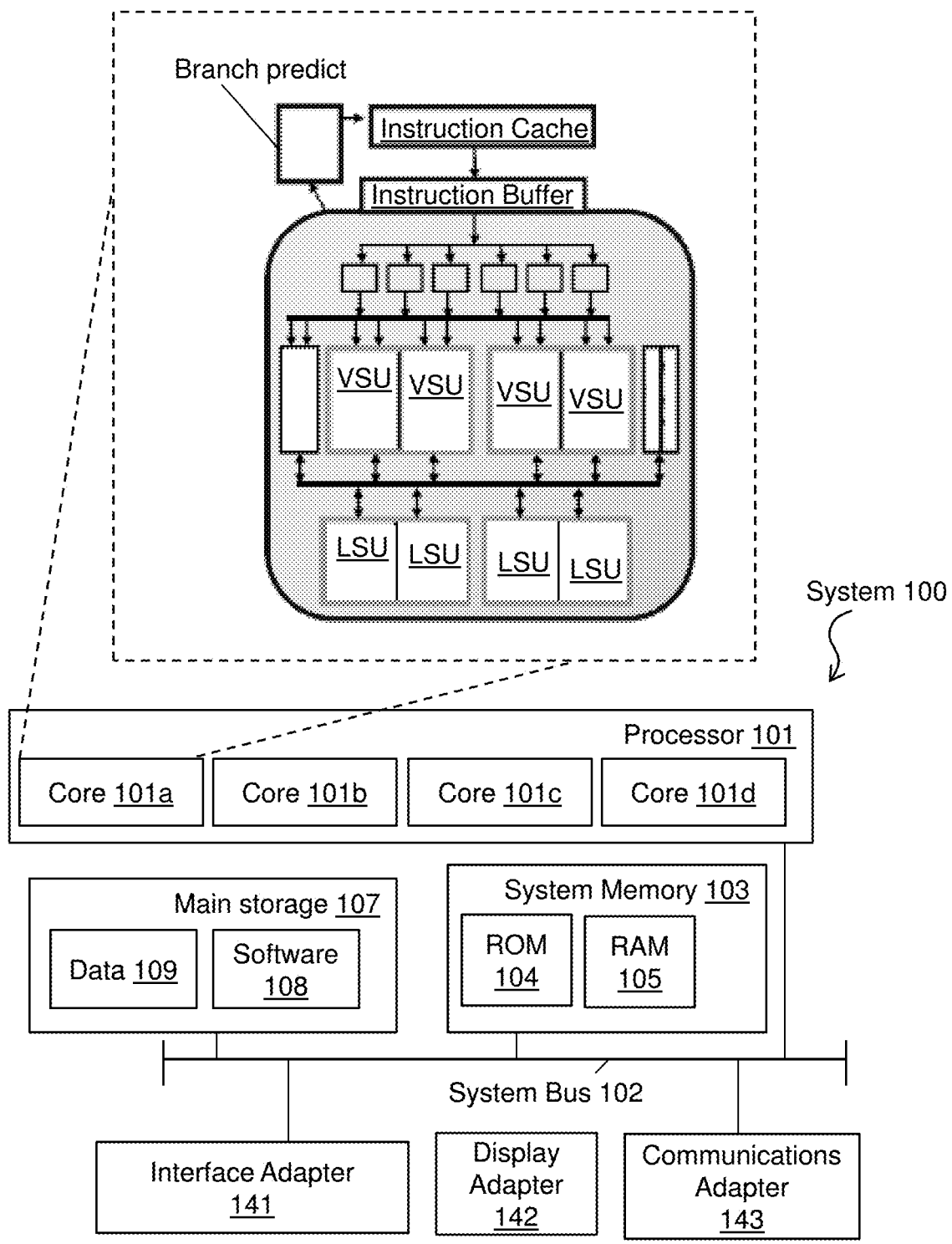
FIG. 1 depicts a system in accordance with one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as indicated above, the multi-core processor scheduling conundrum is whether to activate the new thread on an already active core or to assign the new thread to a new core that requires activation. Further, the multi-core processor scheduling conundrum causes thread contention (and stalls), along with limits in core performance, because there exists a finite number of execution units on each core. The multi-core processor scheduling conundrum also results in low execution unit utilization because all threads are waiting on the same execution unit, while others are unused.

Turning now to an overview of the aspects of the invention, one or more embodiments of the invention disclosed herein may include a system, method, and/or computer program product (herein generally referred to as a system).

The system addresses the above-described shortcomings of the prior art by performing workload profiling based on execution unit utilization via performance monitoring hardware (in addition to cache sensitivity and thread transience) with a multi-core processor. More particularly, the system logs an execution unit sensitivity (EUS) to an operating system and, subsequently, utilizes the EUS during workload scheduling to minimize core-sharing between a workload with a similar EUS being scheduled on threads of same core. Thus, embodiments herein measure thread specific execution unit utilization and then scheduling tasks, such that measuring thread specific execution unit usage is an input while scheduling software on a hardware thread is the effect.

Turning now to FIG. 1, a system 100 for implementing the teachings herein is shown in according to one or more embodiments of the invention. In this embodiment, the system 100 has a multi-core processor 101, which can include one or more cores 101a, 101b, 101c, and 101d. Each of the one or more cores 101a, 101b, 101c, and 101d can include one or more execution units (a.k.a., thread specific execution units, which perform specific operations and calculations as instructed by a computer program), a control unit, and various other parts and operating circuitry, such as a branch prediction (e.g., for sophisticated instruction scheduling and branch prediction), an instruction cache, an instruction buffer. Example of the one or more execution units include, but are not limited to, vector scalar units (VSU) and load store units (LSU).

The multi-core processor 101, also referred to as a processing circuit, microprocessor, computing unit, is coupled via a system bus 102 to a system memory 103 and various other components. The system memory 103 includes read only memory (ROM) 104 and random access memory (RAM) 105. The ROM 104 is coupled to the system bus 102 and may include a basic input/output system (BIOS), which controls certain basic functions of the system 100. The RAM is read-write memory coupled to the system bus 102 for use by the multi-core processor 101.

The system 100 of FIG. 1 includes a main storage 107, which is an example of a tangible storage medium readable executable by the multi-core processor 101. Each core in the multi core processor may include multiple hardware threads which can execute software on each of the threads simultaneously by sharing the executions units and resources of the core. The main storage 107 stores software 108 and data 109. The software 108, which can be an operating system or other computer program, is stored as instructions for execution on the system 100 by the multi-core processor 101 (to perform a process, such as the process flows of FIGS. 2-3). The data 109 includes a set of values of qualitative or quantitative variables organized in various data structures to support and be used by operations of the software 108.

The system 100 of FIG. 1 includes one or more adapters (e.g., main storage controllers, network adapters, graphics adapters, etc.) that interconnect and support communications between the multi-core processor 101, the system memory 103, the main storage 107, and other components of the system 100 (e.g., peripheral and external devices). In one or more embodiments of the present invention, the one or more adapters can be connected to one or more I/O buses that are connected to the system bus 102 via an intermediate bus bridge, and the one or more I/O buses can utilize common protocols, such as the Peripheral Component Interconnect (PCI).

As shown, the system 100 includes an interface adapter 141 interconnecting a keyboard, a mouse, a speaker, and a microphone to the system bus 102. The system 100 includes a display adapter 142 interconnecting the system bus 102 to a display. The system 100 includes a communications adapter 141 interconnecting the system bus 102 with a network enabling the system 100 to communicate with other systems, devices, data, and software, such as a server and a database.

Thus, as configured in FIG. 1, the operations of the system 100 are necessarily rooted in the computational ability of the multi-core processor 101 (and cores 101a, 101b, 101c, and 101d therein) to overcome and address the herein-described shortcomings of the multi-core processor scheduling conundrum. In this regard, the software 108 and the data 109 provide the technical effects and benefits and improve computational operations of the multi-core processor 101 of the system 100 to minimize core-sharing between workload with similar EUSs (thereby increasing the efficiency of the system 100).

Figure 2:
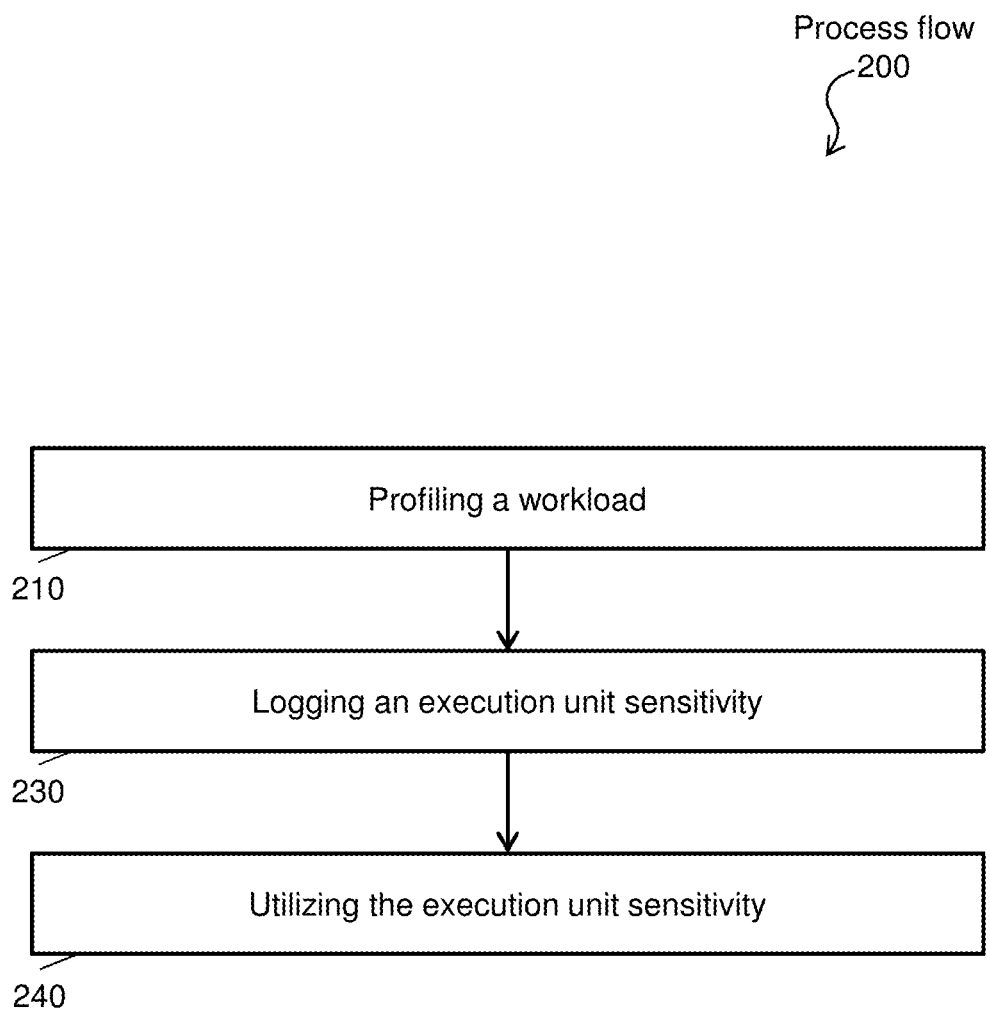
FIG. 2 depicts a process flow in accordance with one or more embodiments.

Turning now to FIG. 2, a process flow 200 is depicted in accordance with one or more embodiments. The process flow 200 begins at block 210, where the system 100 profiles a workload. The workload can be received from the software 108 by the multi-core processor 101. The workload is received for execution by a core of the one or more cores 101a, 101b, 101c, and 101d of the multi-core processor 101. The profiling of the workload can be based on an execution unit utilization determined by performance monitoring hardware (in addition to cache sensitivity and thread transience). More particularly, the workload is profiled, along with its past occurrences, so that a utilization of a particular execution unit [ ] of one of the cores of the system 100 is memorialized (e.g., utilization of each execution unit is logged). Note that each workload can require a mix of unit usage.

In accordance with one or more embodiments, the system 100 has a map of the execution units on each core, the workloads (e.g., tasks/threads) running on each core, and an expected utilization of each execution unit. For example, hardware counters are used for EUS profiling, e.g., the map. During instruction scheduling (e.g., post cracking), the system 100 determines a log execution unit utilization of each thread. For N instructions related to thread I, the system 100 assigns to execution unit (EU) <0:M>, counted as x(0), x(1), . . . x(M), according to Equation 1. Next the EUS is determined according to Equation 2. Note that flushed instructions not counted (as it is throw away work). Also note that the EUS computation can be selective.

$$\Sigma(x(i))\backslash/i=0M=N \qquad \text{Equation 1}$$

$$\text{thread}(i)=\text{Round}(x(i)/N) \qquad \text{Equation 2}$$

At block 230, the system 100 logs a EUS to an operating system (e.g., with respect to the workload). The logging can occur post execution of the workload. For example, at the end of thread execution, the EUS is written to a special purpose register and read by operating system. Note that the operating system can determine to read the EUS data from special purpose register at any optimal interval or context switch. At block 240, the system 100 utilizes the EUS during workload scheduling. Utilizing the EUS minimizes core-sharing between workloads with similar EUSs. Scheduler maintains a score-board of EUS of all active threads (on their respective cores). With pre-existing information on maximum EU capacity per core, scheduler also maintains core execution unit slack table. The core execution slack table is a representation of how many EUs of each type are available for newer tasks to utilize, in case the newer tasks are scheduled on a corresponding core. The core execution slack table is computed as a maximum EU capacity per core minus a per execution unit utilization of each of the tasks already scheduled on the core. A '0' slack for a per execution unit on a core indicates that no tasks that require such an EU ought to be scheduled on that core. When a new task is allocated to a particular core, its execution unit slack table is updated by subtracting the anticipated execution unit utilization(s) from the existing core execution unit slack table.

Figure 3:
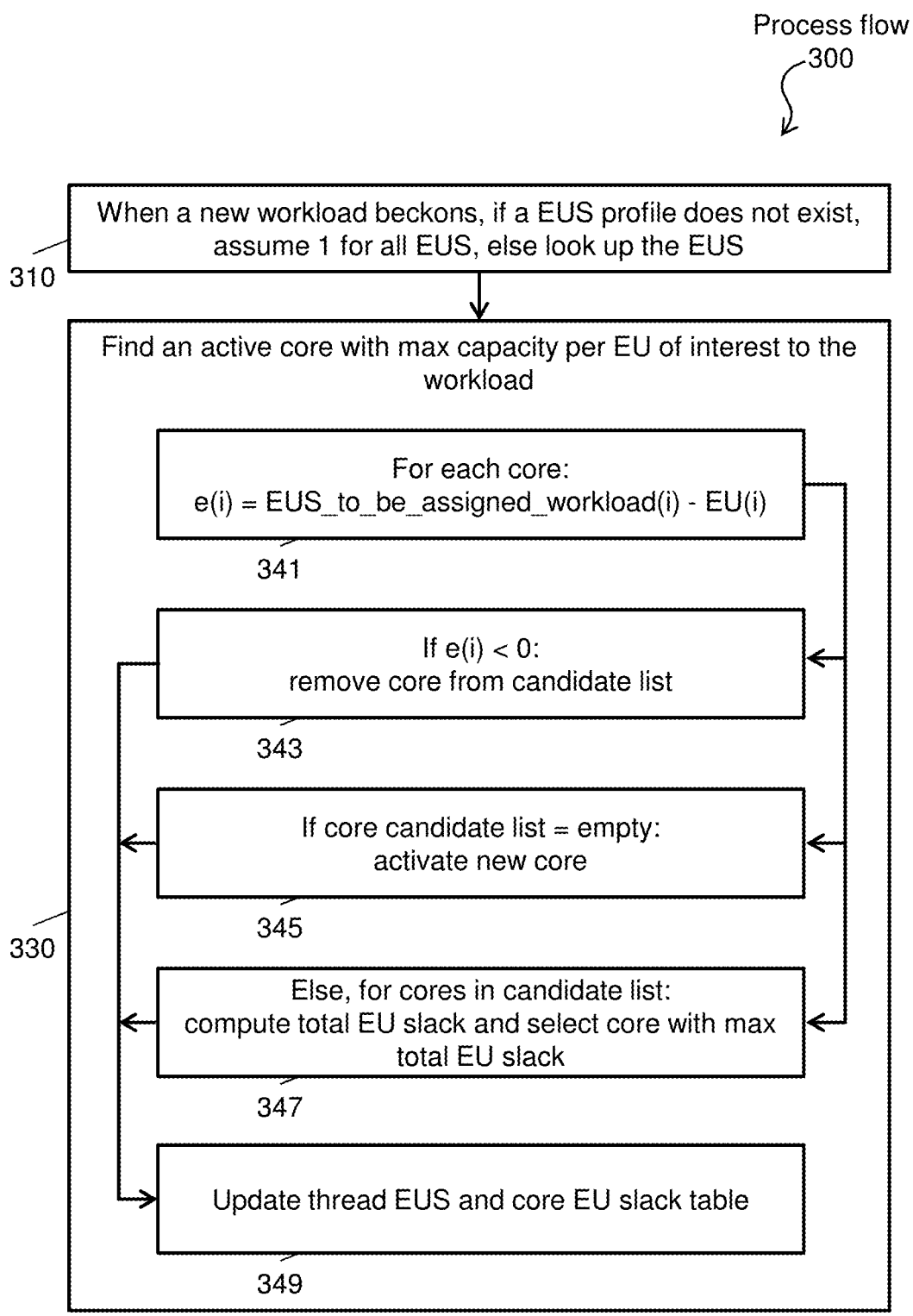
FIG. 3 depicts a process flow in accordance with one or more embodiments.

Turning now to FIG. 3, a process flow 300 is depicted in accordance with one or more embodiments. The process flow 300 begins at block 310, where the system 100 assume one for all EUS if a EUS profile does not exist (others, an EUS profile is looked-up) when a new workload beckons/arrives. At block 330, find active core with maximum capacity per execution unit of interest to the new workload. To find an active core, the process flow 300 utilizes the operation of blocks 341, 343, 345, 347, and 349.

At block 341, for each core, e(i)=EUS_to_be_assigned_workload(i)−EU(i). Next, one of three actions are taken by the system 100. A first action, at block 343, occurs if e(i)<0. Then, the system 100 removes a core from a core candidate list. A second action, at block 345, occurs if the core candidate list is empty. Then, the system 100 activates a new core. A third action, at block 347, occurs otherwise. The third action includes computing, by the system, a total execution unit slack (note that other intelligence of the system 100 can be utilized here) for cores in the core candidate list and includes selecting a core with maximum total execution unit slack. At block 349, the system 100 updates a thread EUS and a core execution unit slack table, according to the first, second, or third actions. If there are no new cores to activate in the second step, then the system falls back to the third step. The thread EUS table, which is maintained for each core, contains the per thread execution unit utilization and is essentially a per thread mapping of the workload EUS table. When a task is scheduled to a particular core as a particular thread, the contents of the workload EUS table for that task is copied to the core thread EUS table.

In accordance with one or more embodiments, the system 100 can include a partially working core (e.g., where a less critical EU, like vector unit or accelerator unit, may be faulty). Core initiation can permanently disable that less critical EU and update EU fault (EUF) special purpose register (per core) with bits corresponding to that faulty and less critical EU. An operating system scheduler logic can 'or' the core EUS vector to EUF vector to compute core an EU usage. Note that a faulty EU is marked fully used and hence unavailable (e.g., a partial good core with one or more faulty execution units is marked, including marking the one or more faulty units as available and having '0' execution unit slack). Operating system scheduler avoids placing an application with an EUS requiring the less critical EU that is at fault on the selected partially working core. However, if the application does issue instruction that needs the faulty EU, a hypervisor facility unavailable exception can be generated by the hardware with EUF type, such that hypervisor software can relocate the application to other working cores. At an OS scheduler level, primarily all good cores are used for application, but partial good cores are used as additional engines that can help when work queue is large. Further, a partial good core is deemed to be fit to execute all critical operating system and hypervisor software and expected to have corner cases only in EU units that are used at application level, such that operating system/hypervisor software is not impacted. Further the fault can be a performance and chip level resource constraint, like cache/bus, that can make the core less favored (but still functionally working).

In accordance with one or more embodiments, the system can communicate EUS data from hardware to an operating system with a special purpose register or a similar mechanism like memory locations which are readily accessible to operating system and hypervisor software. This communication includes a low overhead mechanism and provides compact representation of software's profile and cores current usage/slack. The technical effect and benefit is to a generalization of this implementation in the operating system such that an applicability on partially good cores or more generally "core with different capability" can be included.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for utilization profiling of thread specific execution units and scheduling software on a multi-core processor, the method comprising:
    profiling, by the multi-core processor, a workload received for execution by a core of the multi-core processor;
    logging, by the multi-core processor, an execution unit sensitivity to an operating system with respect to the workload; and
    utilizing, by the multi-core processor, the execution unit sensitivity for subsequent workload scheduling to minimize core-sharing between workloads with same execution unit sensitivities, wherein the subsequent workload scheduling includes finding an active core with maximum capacity per execution unit of interest to a subsequent workload and wherein finding the active core includes removing an ineligible core from a core candidate list.

2. The method of claim 1, wherein the profiling can be based on an execution unit utilization determined by performance monitoring hardware of the multi-core processor.

3. The method of claim 1, wherein logging the execution unit sensitivity includes determining current workloads on each core and an expected utilization of each execution unit.

4. The method of claim 1, wherein finding the active core includes activating a new core if a core candidate list is empty.

5. The method of claim 1, wherein finding the active core includes computing a total execution unit slack for cores in a core candidate list and selecting a core with maximum total execution unit slack.

6. The method of claim 1, wherein a partial good core with one or more faulty execution units is marked, including marking the one or more faulty units as available and having '0' execution unit slack.

7. A computer program product for utilization profiling of thread specific execution units and scheduling software on a multi-core processor, the computer program product comprising a computer readable storage medium having program instructions embodied therewith, the program instructions executable by the multi-core processor to cause:

profiling, by the multi-core processor, a workload received for execution by a core of the multi-core processor;

logging, by the multi-core processor, an execution unit sensitivity to an operating system with respect to the workload; and utilizing, by the multi-core processor, the execution unit sensitivity for subsequent workload scheduling to minimize core-sharing between workloads with same execution unit sensitivities, wherein the subsequent workload scheduling includes finding an active core with maximum capacity per execution unit of interest to a subsequent workload and wherein finding the active core includes removing an ineligible core from a core candidate list.

8. The computer program product of claim 7, wherein the profiling can be based on an execution unit utilization determined by performance monitoring hardware of the multi-core processor.

9. The computer program product of claim 7, wherein logging the execution unit sensitivity includes determining current workloads on each core and an expected utilization of each execution unit.

10. The computer program product of claim 7, wherein finding the active core includes activating a new core if a core candidate list is empty.

11. The computer program product of claim 7, wherein finding the active core includes computing a total execution unit slack for cores in a core candidate list and selecting a core with maximum total execution unit slack.

12. The computer program product of claim 7, wherein a partial good core with one or more faulty execution units is marked, including marking the one or more faulty units as available and having '0' execution unit slack.

13. A system comprising a multi-core processor and a memory storing program instructions for utilization profiling of thread specific execution units and scheduling software on the multi-core processor, the program instructions executable by the multi-core processor to cause the system to perform:

profiling, by the multi-core processor, a workload received for execution by a core of the multi-core processor;

logging, by the multi-core processor, an execution unit sensitivity to an operating system with respect to the workload; and utilizing, by the multi-core processor, the execution unit sensitivity for subsequent workload scheduling to minimize core-sharing between workloads with same execution unit sensitivities, wherein the subsequent workload scheduling includes finding an active core with maximum capacity per execution unit of interest to a subsequent workload and wherein finding the active core includes removing an ineligible core from a core candidate list.

14. The system of claim 13, wherein the profiling can be based on an execution unit utilization determined by performance monitoring hardware of the multi-core processor.

15. The system of claim 13, wherein logging the execution unit sensitivity includes determining current workloads on each core and an expected utilization of each execution unit.

* * * * *